March 11, 1930.                  J. H. GODFREY                         1,750,001
                         DUAL CONTROL TEMPERATURE REGULATION
                                Filed Aug. 24, 1928
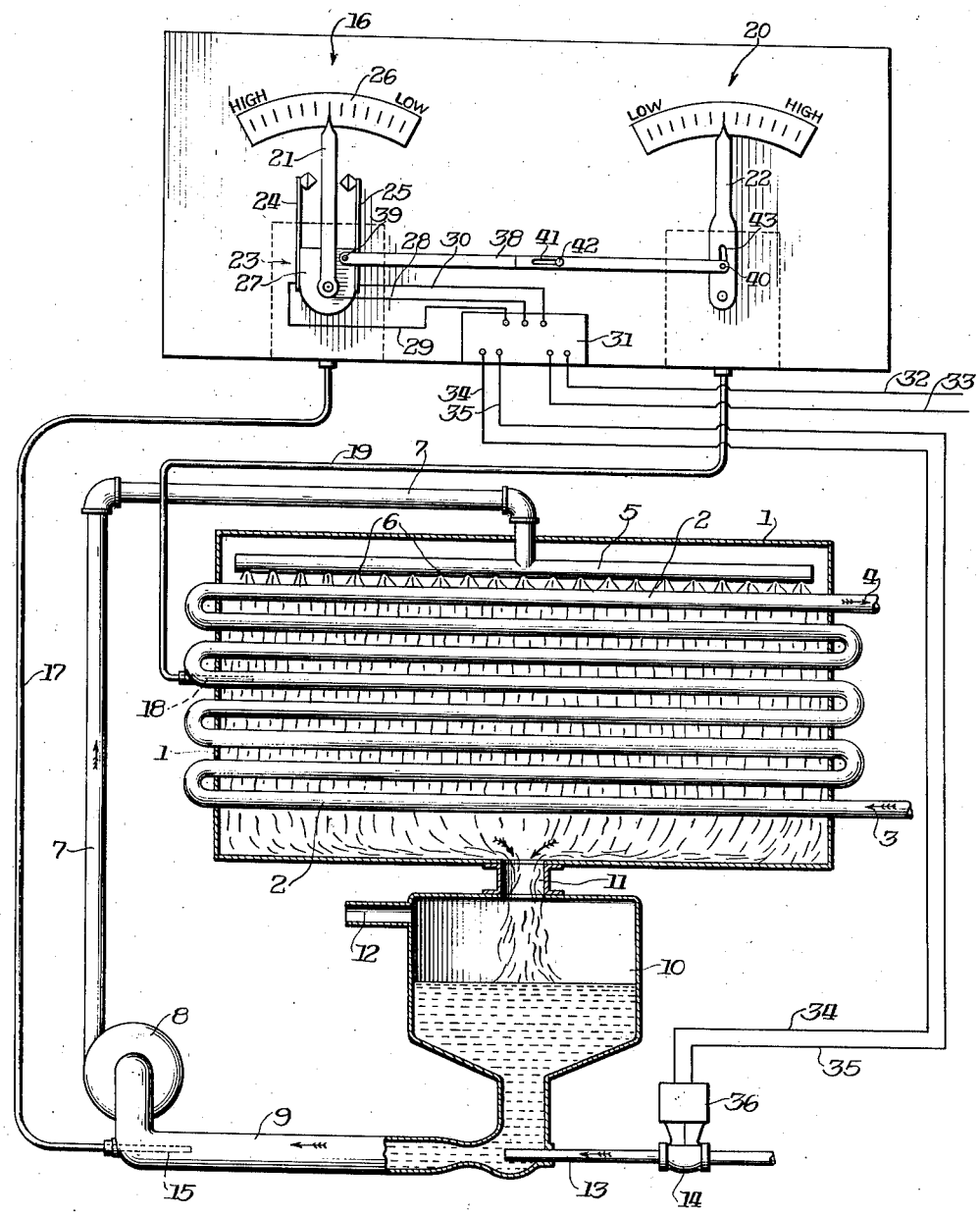
Inventor:
Joseph H. Godfrey
By Hewitt S. Dixon, Atty.

Patented Mar. 11, 1930

1,750,001

UNITED STATES PATENT OFFICE

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS

DUAL-CONTROL TEMPERATURE REGULATION

Application filed August 24, 1928. Serial No. 301,757.

The invention relates generally to the regulation of temperatures in heat exchange apparatus, and more particularly relates to apparatus for and methods of heating milk to uniform temperature for the purpose of pasteurization.

The effectiveness of the pasteurization treatment of milk, by which the pathogenic bacteria in the milk is destroyed, depends upon the heating of every part of the milk to a predetermined degree of temperature for a predetermined period of time. The degree of temperature and the time period may be varied, according to a schedule of relation of temperature to time known to bacteriologists as effectively accomplishing pasteurization, but commercial practice in the dairy industry follows the generally adopted health laws which prescribe a comparatively low temperature and long period of time for the pasteurization treatment, and at the lower temperature it is of increased importance that the degree of heat given the milk shall be precisely accurate and uniform throughout to effectively accomplish the destruction of bacteria without injury to other qualities of the milk.

The common practice is to heat the milk to the required degree of temperature in one of the common types of heaters, and thereafter to hold the milk at that temperature for the required period of time in one of the several types of containers adapted to that purpose.

The temperature regulators commonly used in controlling the milk heaters are provided with a thermally sensitive element placed in the milk at the point of its maximum temperature, and operate to open, close, or intermediately throttle, a valve controlling the introduction of heat (most often steam) into the heating medium (commonly a circulating body of water) responsively to variations of maximum temperature in the milk.

Such common arrangement is incapable of producing a precisely uniform temperature in a flowing stream of milk being heated. The sensitive element being placed at the point of highest temperature of the milk, commonly in the milk outlet from the heater, that element reacts only after the heating of the milk has been accomplished. When the milk at this point is of too high or too low temperature, the sensitive element reacts to actuate the means for correcting the temperature in the milk which follows. That milk which is passing the sensitive bulb can neither be further heated nor cooled, if not then at the desired temperature. In other words, there is a fundamental lag between the reactance of the automatic temperature control and the transmission of the regulated heat to the milk. This lag produces an oscillating cycle of temperature variations in the finished milk above and below the desired degree. The amplitude of the oscillations vary with such factors as design of heater, location of regulating devices, and volume of heating medium in relation to the milk.

It has been attempted to eliminate the temperature oscillations by locating the sensitive bulb in the heating medium instead of in the milk. By so regulating the heating medium temperature, and equalizing the temperature waves in a suitable mixing chamber for the medium before application to the milk, a fixed volume of medium may be circulated through the heater at a constant temperature. If then a constant flow of milk at a fixed initial temperature be opposed to the heating medium, the outflowing milk should have a uniform temperature. The latter temperature may be brought to the desired degree by adjusting the regulated degree of temperature in the medium.

The weakness of this arrangement is that any variation of the rate of flow of the milk, or of the initial temperature of the milk, results in upsetting the balance between milk and heating medium, and causes variations in temperature at the milk outlet. I have heretofore largely overcome this latter result by providing a heater having approximately twice the normal surface area for the transmission of heat from the medium to the milk, and thus enabling the application of the heating medium at substantially the same temperature as that to which it is desired to raise the milk. The heating surface area is sufficiently large that the milk normally will be heated to the desired degree before reaching the milk outlet, the excess surface area being effective to compensate for variations of milk flow and of initial temperature within a range probable of occurrence in a commercial dairy, with very slight variations of temperature in the milk from the desired uniform degree.

It is obvious, of course, that doubling the heating surface area in a milk heater means approximately doubling the cost of that apparatus. The highly perishable and easily contaminated nature of milk for food consumption requires expensive construction in milk heaters for proper protection of the milk. Doubling the cost of such heaters is a matter of serious consequence to users of dairy equipment.

The object of this invention is to provide means for and a method of temperature regulation in milk heaters of common type employing a circulating heating medium, whereby the temperatures of both the medium and the milk are utilized in a novel relation for controlling the final temperature of the milk with precise uniformity.

A further object is to provide for the attainment of such results without substantial increase in cost of the common heating apparatus, and with large savings in cost of such other heaters as heretofore have been capable of approaching the degree of accuracy in temperature control attained by the use of my invention. Other objects and advantages will be apparent in the following description of my invention.

In accomplishing these objects, I have discovered the principles of a method of dual control temperature regulation, by which an automatically maintained balance is created between the heating medium temperature and an intermediate milk temperature, and by which uniformity of final milk temperature is attained with a degree of precision never accomplished heretofore. I have embodied these principles in apparatus which has successfully met the objectives under the conditions of commercial dairy practice, with greatly increased accuracy of temperature control over that attained by the apparatus heretofore commonly employed in pasteurization processes.

A preferred embodiment of my invention is illustrated in the accompanying drawing. I have represented therein more or less diagrammatically the well known individual structural components of a milk heating system with which I have incorporated the novel features of my invention. It will be understood, however, that various substitution of parts and changes in form, construction, and arrangement may be made by those skilled in the art without departing from the scope and spirit of the invention as expressed in the appended claims.

Referring to the drawings, the numeral 1 indicates a heater casing forming an enclosed chamber within which are serially arranged the coils 2 of a continuous milk pipe or conduit having its inlet at 3 and its outlet at 4, respectively connected in practice to a milk storage container (not shown) and to a hot milk holding apparatus (not shown). The heating medium, hot water, is delivered at the top of the casing 1 through a pipe 5 having apertures 6 for spraying the hot water continuously over the coils 2 of the milk conduit. The spray pipe 5 is connected with a supply pipe 7 leading to the discharge port of a pump 8. The pump inlet is connected with an intake pipe 9 leading to a reservoir 10. The reservoir 10 receives the spent water draining from the bottom of the casing 1 through a communicating opening 11, and is provided with an overflow opening 12. Heat is imparted to the water by injecting steam into the intake pipe 9 through a steam connection 13 leading to a steam supply source and controlled by an automatically actuated valve 14.

The above mentioned devices are well known to the dairy industry, and further detailed description of structure is deemed not to be necessary herein. The heater may be of the well known barrel type, or the well known double tube type, instead of the spray type herein shown. The steam injecting means may be any of several well known types, and, in fact, the water may be heated by other means than the direct injection of steam. Any circulatory system for the water is satisfactorily usable, a closed circulation of the water being preferable for economy in heating the water.

In the circuit of the water being pumped to the milk heater, and after the point at which the water heater 13 has acted thereupon, I have placed a thermosensitive bulb 15 of conventional structure forming part of a conventional temperature responsive or indicating mechanism 16 to which it is connected by the tube 17. Another conventional thermosensitive bulb 18 is placed in the milk stream within the heater, being positioned in the coil 2 intermediately of the inlet 3 and outlet 4. substantially midway thereof. A tube 19 leads from the bulb 18 to a second temperature responsive mechanism 20, also of conventional structure. The typical mechanisms 16 and 20 respectively include swinging indicator arms 21 and 22, the arm 21 being actuated in well known manner by variations in temperature of the medium about the bulb 15, and the arm 22 being similarly actuated by variations in temperature of the milk about the bulb 18.

While I have illustrated herein the common type of temperature responsive mechanisms characterized by the swinging indicator arms, my invention is equally applicable to other well known types of such mechanisms, as, for example, the sylphon or diaphragm actuated plunger type, and which may be mechanically connected to the steam valve 14 for control of the water heating function. The type herein illustrated has the advantage of visually indicating temperatures as well as functioning to control the water heating means, as hereinafter described.

The indicating mechanism 16, of which the arm 21 is movable responsively to temperature variations in the heating medium, is provided with a device 23 by which a temperature may be selectively established at which the heating medium is to be maintained normally. The device 23 comprises a pair of spaced members 24 and 25 positioned on opposite sides of the swinging arm 21 and defining between them a limited arc of movement for the arm 21. The mean position of the arm 21 between the members 24 and 25 represents the established temperature for the heating medium, as indicated on the scale 26. The contact members 24 and 25 are electric conductors, supported on an insulator base 27 pivotally mounted coaxially with the arm 21, the base and supported members being swingable for the selective establishment of a mean position for the arm 21 at the temperature to which the medium is to be heated.

The arm 21 and the members 24 and 25 are severally electrically connected by conductors 28, 29 and 30 with a conventional relay device 31, to which electric current is furnished by the supply conductors 32 and 33. A pair of conductors 34 and 35 lead from the relay 31 to an electrically actuated mechanism 36 for operating the valve 14 controlling the injection of steam into the heating medium. Upon a drop in temperature of the hot water passing the bulb 15, the arm 21 swings to the right or low side of the temperature scale 26 and makes electrical contact with the member 25. The circuit so completed in the conductors 28 and 30 actuates the relay 31 to supply current through the conductors 34 and 35 to the valve operating mechanism 36 of such direction as to cause an increased opening of the valve 14 to admit more steam to the circulating water. As the steam is effective to raise the temperature of the water passing the bulb 15, the arm 21 is swung oppositely toward the high side of the temperature scale, thereby breaking contact with the member 25 and ultimately making contact with the member 24. Thereupon a circuit through conductors 28 and 29 is completed, the relay 31 reversely actuates the mechanism 36, and the valve 14 is operated to decrease the supply of steam to the circulating water. The intermittent reoccurrence of these operations effect an approximate maintenance of the water temperature at the selected degree established by the position of the members 24 and 25.

The temperature establishing device 23, the relay 31 and the valve operating mechanism 36, with their connections, are well known components of temperature regulating apparatus in common use in many arts. In all such common uses, an adjusting means is provided in connection with the device 23, whereby the members 24 and 25 may be manually set to establish a desired temperature, such degree being thereby fixed until further manual adjustment is made. The other well known types of temperature responsive mechanisms hereinbefore mentioned, also are commonly provided with manually adjustable means for fixing a temperature to be maintained, and variations from which temperature cause the alternate operation of controlling means for increasing and decreasing the imparting of heat to a heating medium. It is this quality of fixedness in the manually adjusted temperature which defines in part the failure of such apparatus in its common use to accomplish precise temperature regulation in milk being heated for pasteurization. Referring to the typical milk heater illustrated herein, in which economy of structural cost dictates that the area for transmission of heat to the milk, represented by the surface area of the coils 2, shall be as small as is necessary to progressively raise the temperature of the milk from its incoming temperature at 3 to the required pasteurizing temperature at the coil outlet 4 during its passage from inlet to outlet, it will be obvious that a fixed heating medium temperature may be set for the arm 21 with approximately uniform resulting temperature in the circulating hot water, (in practice somewhat higher than the desired outlet temperature of the milk) and that approximately uniform temperature in the milk will be had at the coil outlet 4 so long only as the rate of flow and the temperature of the incoming milk remains constant. It will be further obvious that a faster or slower rate of milk flow in the coils 2, or a higher or lower temperature of the incoming milk at the inlet 3, will be reflected in a corresponding increase or decrease in temperature of the outflowing milk at the outlet 4, because the temperature of the heating medium remains constant at some degrees above the desired milk outlet temperature, by reason of the fixedly established regulated temperature of the medium. As hereinbefore explained, such changes in the inflowing milk may be largely compensated for, within a practical range, by greatly increasing the heat transmitting area of the heater, as by doubling the length of the coils 2 with proportionate increase of the heater structure otherwise, but at greatly increased cost of the apparatus.

To conserve the obvious advantage of economical construction, and also to accomplish a precision of temperature regulation heretofore not attained in commercial pasteurization, I have supplemented the well known operative arrangement of the heating medium temperature regulators described by the application thereto of my present invention for automatically compensating in the medium temperature for changes of flow and temperature in the milk stream, to the end that no material variations of temperature occur in the milk at the heater outlet because of such changes. I accomplish this by utilizing the variations of milk temperature in the heater to automatically readjust the setting of the established temperature of the heating medium, and I measure these variations of milk temperature at an intermediate point in the milk conduit sufficiently distant from the milk outlet so that the readjusted temperature of the circulating medium may be applied to the milk as it flows through the latter portion of the conduit with immediate compensating effect resulting in uniform final temperature of the milk at the heater outlet.

It will be noted from the position of the bulb 18 in the milk conduit 2, that the indicator arm 22 swings responsively to variations of milk temperature in a portion of the conduit substantially midway of the milk inlet and milk outlet. To give effect to these midway milk temperature variations upon the establishment of the hot water temperature, I have arranged the actuating mechanism for the arm 22 so that it swing reversely to the arm 21 with changes of temperature, as will be apparent by the marking of the scale 37 compared with scale 26, and have operatively connected the arm 22 to the medium temperature establishing device 23.

A connecting bar 38 is pivotally attached at one end to the pivoted base 27 supporting the members 24 and 25. The pivotal attachment, as indicated at 39, is eccentric to the pivoted axis of the base 27. The other end of the bar 38 is pivotally attached to the arm 22 eccentrically of its pivoted axis, as indicated at 40.

A drop in the intermediate temperature of the milk, as caused by an increase in rate of flow or a decrease in initial milk temperature, will cause the arm 22 to swing to the left or low side of its scale. The bar 38 imparts this movement to the base 27 carrying the members 24 and 25 to the left or high side of the scale 26, thereby raising the established temperature for the heating medium. Also in such movement, the member 25 is carried into contact with the arm 21, causing operation of the valve 14 to increase the steam supplied to the circulating medium and immediately raise its temperature to the newly established degree at which the arm 21 assumes its mean position. The velocity of the circulating water is such that the hotter water is flowing over the latter portion of the milk coils before the milk which caused the change has passed therefrom, and the extra heat necessary to bring the milk temperature up to the uniform outlet temperature is thereby supplied. The new relation of milk and water temperatures will be maintained until another change occurs in the milk stream, whereupon substantially instant readjustment is automatically made. A rise in intermediate milk temperature, as caused by a decrease in rate of flow or an increase in initial milk temperature, affects the train of operative parts reversely to that last described, and immediately lowers the hot water temperature to maintain the uniform milk outlet temperature.

In my dual control of the water temperature regulation, the location of the sensitive bulb for registering the milk temperature in a portion of the milk conduit which is distantly removed from the milk outlet is especially advantageous. More than ninety per cent of the heat transferred from the hot water to the milk occurs before the milk reaches the illustrated location of the sensitive bulb. This is because of the great difference in temperature between the cold incoming milk and the hot water flowing over the milk coils. In that portion of the conduit between the bulb and the milk outlet, there occurs the least in amount but the most important in final effect of the heat transfer, and it is there that the first and most important effect is had from the regulated temperature of the water as it first enters the heater. By reversely regulating the temperature of the water responsively to temperature variations of the milk entering this latter portion of the coils, the effect of such regulation is had upon the milk while passing through that portion of the coils, and because of the proportionately small amount of heat energy there being transferred the accuracy of that effect in determining the final milk temperature is greatly enhanced.

Different operating conditions, such as different standard initial temperatures of the milk in individual dairies and different degrees of heating efficiency characteristic of the several types of heaters, necessitate provision for varying the normal differential between the established hot water temperature and the intermediate milk temperature to accomplish the required pasteurization temperature at the milk outlet. To so adjust the normal temperature differential, in the present embodiment of my invention, I have provided for longitudinal adjustment of the bar 38, preferably by constructing it in two partially overlapping sections having any suitable means for adjustably fastening the sections, as by a slot 41 in one of the sections and an overlying clamp screw 42 positioned in the slot and threaded into the other section. By this means the arms 21 and 22 may be adjusted to the correct differential as indicated on the scales 26 and 37, so that when operating with normally constant conditions for the particular apparatus the status of the controlling devices is maintained substantially constant.

The different operating conditions mentioned may necessitate also another adjustment in the relation of the dual control temperatures. It may be that the variation of a degree in the intermediate milk temperature in one heater requires a greater corresponding change in the temperature of the water to accomplish the same final temperature than is required for that intermediate milk temperature variation in another heater. Such a difference follows in case of different standard storage temperatures at which the milk is pumped to the heater. To effect this adjustment in the present embodiment of my invention, I have provided for radial adjustment of the pivotal connection between the bar 38 and the arm 22 in its eccentric positional relation to the pivotal axis of the arm 22, preferably by forming an arcuate slot 43 having a radius approximately equal to the length of the bar 38 and with its center at the opposite pivotal connection of the bar, within which the pivot 40 is positioned and secured at any selected distance from the pivotal axis of the arm 22 by any suitable means. By this adjustment, the extent of swing of the members 24 and 25 in relation to a given swing of the arm 22 may be varied, and thereby the extent of temperature change in the heating medium varied in relation to the extent of the milk temperature variation. These two adjustment features enable the adaptation of my invention to the peculiar characteristics of any of the well known types of milk heaters and temperature regulators.

While I have described a specific form of structure for the embodiment of my invention with specific types of heater and temperature regulator, I have in mind that the operative principles and methods of practice of my invention may be embodied in changed form for adaptation to other well known types of heaters and regulators, and in so far as such changes in form fall within the scope of the appended claims, I desire to secure them as my invention.

I claim as my invention:

1. Apparatus of the class described comprising, a conduit for liquid, a conduit for medium in heat exchange relation thereto, means for maintaining a variable determinable normal temperature in the medium supplied to said medium conduit, and means associated with said medium temperature maintaining means and automatically operable therewith to effect the raising and lowering of said medium normal temperature responsively respectively to decreases and increases of temperature maintained by said medium temperature maintaining means in the liquid passing a portion of said liquid conduit.

2. Apparatus of the class described comprising, a conduit for liquid, a conduit for medium in heat exchange relation thereto, heating means, means for automatically controlling said heating means to regulate the temperature of said medium uniformly at a variable determinable normal degree and having a thermosensitive element in said medium, and temperature responsive means associated with said regulating means and having a thermosensitive element in said liquid, said temperature responsive means automatically causing said regulating means to raise and lower the normal degree of medium temperature responsively respectively to the decreases and increases of temperature of said liquid.

3. Apparatus of the class described comprising, a conduit for liquid, a conduit for heat exchange medium arranged in heat exchange relation to said liquid conduit, means for heating the medium supplied to said medium conduit, controlling means for said medium heating means, thermally actuated means operable responsively to variations of temperature of said medium, thermally actuated means operable responsively to variations of temperature of the liquid in said liquid conduit, and means operatively related to said controlling means and to both said thermally actuated means and operable upon a rise of temperature of said medium and/or said liquid to cause said controlling means to decrease the effect of said medium heating means, and operable upon a fall of temperature of said medium and/or said liquid to cause said controlling means to increase the effect of said medium heating means.

4. Apparatus of the class described comprising, a conduit for liquid, a conduit for heat exchange medium arranged in heat exchange relation to said liquid conduit, means for heating the medium supplied to said medium conduit, controlling means for said medium heating means, thermally actuated means operable responsively to variations of temperature of said medium, thermally actuated means operable responsively to variations of temperature of the liquid in said liquid conduit, and means operatively related to said controlling means and to both said thermally actuated means and operable upon a rise of temperature of said medium and/or said liquid to cause said controlling means to decrease the effect of said medium heating means, and operable upon a fall of temperature of said medium and/or said liquid to cause said controlling means to increase the effect of said medium heating means, said last enumerated means being adjustable to vary the relative operative effect of said thermally actuated means respectively upon the actuation of said controlling means.

5. Apparatus of the class described comprising, a conduit for liquid, a conduit for medium arranged in heat exchange relation to said liquid conduit, means for heating said medium, means for regulating the operation of said heating means to maintain a selectively predetermined degree of temperature of the medium supplied to said medium conduit and having a device for selectively determining said degree of medium temperature, and means for automatically adjusting the operative effect of said device responsively to variations of temperature of a liquid passing a portion of said liquid conduit whereby the variations of said liquid temperature above and below a uniform degree automatically effect the lowering and raising respectively of the degree of temperature to which said medium is regulated.

6. Apparatus of the class described comprising, a conduit for liquid, a conduit for medium arranged in heat exchange relation to said liquid conduit, means for heating said medium, means for regulating the operation of said heating means to maintain a selectively predetermined degree of temperature of the medium supplied to said medium conduit and having a device for selectively determining said degree of medium temperature, and means for automatically adjusting the operative effect of said device responsively to variations of temperature of a liquid passing a portion of said liquid conduit whereby the variations of said liquid temperature above and below a uniform degree automatically effect the lowering and raising respectively of the degree of temperature to which said medium is regulated, said last mentioned means being adjustable to selectively vary the normal difference between said uniform degree of liquid temperature and said predetermined degree of medium temperature.

7. Apparatus of the class described comprising, a conduit for liquid, a conduit for medium arranged in heat exchange relation to said liquid conduit, means for heating said medium, means for regulating the operation of said heating means to maintain a selectively predetermined degree of temperature of the medium supplied to said medium conduit and having a device for selectively determining said degree of medium temperature, and means for automatically adjusting the operative effect of said device responsively to variations of temperature of a liquid passing a portion of said liquid conduit whereby the variations of said liquid temperature above and below a uniform degree automatically effect the lowering and raising respectively of the degree of temperature to which said medium is regulated, said last mentioned means being adjustable to selectively vary the extent of variation in said predetermined degree of medium temperature in relation to the extent of variation from said uniform degree of liquid temperature.

8. Apparatus of the class described comprising, a conduit for liquid, a conduit for heat exchange medium arranged in heat exchange relation to said liquid conduit, means for heating the medium supplied to said medium conduit, thermally actuated means having an element movable responsively to variations of temperature of said medium, thermally actuated means having an element movable responsively to variations of temperature of the liquid in said liquid conduit, and controlling means for said medium heating means, said controlling means including a device associated with one of said elements which may be variably positioned in relation to said element and whereby the movement of said element relatively to said device in one direction causes said controlling means to increase the effect of said medium heating means and whereby movement in the other direction causes said controlling means to decrease the effect of said medium heating means, said device being operatively related to the other of said elements whereby the movement of said other element causes a shifting of position of said device responsively to said variations of temperature of said liquid.

9. Apparatus of the class described comprising, a conduit for liquid, a conduit for heat exchange medium arranged in heat exchange relation to said liquid conduit, means for heating the medium supplied to said medium conduit, thermally actuated means having an element movable responsively to variations of temperature of said medium, thermally actuated means having an element movable responsively to variations of temperature of the liquid in said liquid condut, and controlling means for said medium heating means, said controlling means including a device associated with one of said elements which may be variably positioned in relation to said element and whereby the movement of said element relatively to said device in one direction causes said controlling means to increase the effect of said medium heating means and whereby movement in the other direction causes said controlling means to decrease the effect of said medium heating means, and an operable connection between said device and the other of said elements whereby the movement of said other element causes a shifting of position of said device, said connection being adjustable to vary the normal positional relation between said device and said other element.

10. Apparatus of the class described comprising, a conduit for liquid, a conduit for heat exchange medium arranged in heat exchange relation to said liquid conduit, means for heating the medium supplied to said medium conduit, thermally actuated means having an element movable responsively to variations of temperature of said medium, thermally actuated means having an element movable responsively to variations of temperature of the liquid in said liquid conduit, and controlling means for said medium heating means, said controlling means including a device associated with one of said elements which may be variably positioned in relation to said element and whereby the movement of said element relatively to said device in one direction causes said controlling means to increase the effect of said medium heating means and whereby movement in the other direction causes said controlling means to decrease the effect of said medium heating means, and an operable connection between said device and the other of said elements whereby the movement of said other element causes a shifting of position of said device, said connection being adjustable to vary the extent of the shifting of position of said device in relation to the extent of the movement of said other element.

11. Apparatus of the class described comprising, a heat exchanger adapted to heat milk by the medium of flowing hot water, means for heating said water, a controller for said heating means, a temperature responsive device having an element movable responsively to variations of temperature of said water, a pair of members supported in spaced movable relation to said element and defining therebetween a position of said element representative of a degree of temperature to be maintained in said water, means associated with said members for actuating said controller whereby contact between said element and one of said members causes said controller to increase the action of said heating means and whereby contact between said element and the other of said members causes said controller to decrease the action of said heating means, a temperature responsive device having an element movable responsively to variations of temperature of said milk, and connecting means between said last mentioned element and said pair of members whereby said members are moved by the movement of said last mentioned element to effect a raising of the maintained degree of temperature of said water upon the lowering of the temperature of said milk and to effect a lowering of the maintained degree of temperature of said water upon the raising of the temperature of said milk.

12. Apparatus of the class described comprising, a heat exchanger adapted to heat milk by the medium of flowing hot water, means for heating said water, a controller for said heating means, a temperature responsive device having an element movable responsively to variations of temperature of said water, a pair of members supported in spaced movable relation to said element and defining therebetween a position of said element representative of a degree of temperature to be maintained in said water, means associated with said members for actuating said controller whereby contact between said element and one of said members causes said controller to increase the action of said heating means and whereby contact between said element and the other of said members causes said controller to decrease the action of said heating means, a temperature responsive device having an element movable responsively to variations of temperature of said milk, and connecting means between said last mentioned element and said pair of members whereby said members are moved by the movement of said last mentioned element to effect a raising of the maintained degree of temperature of said water upon the lowering of the temperature of said milk and to effect a lowering of the maintained degree of temperature of said water upon the raising of the temperature of said milk, said connecting means being adjustable to selectively vary the normal positional relation between said pair of members and said last mentioned element.

13. Apparatus of the class described comprising, a heat exchanger adapted to heat milk by the medium of flowing hot water, means for heating said water, a controller for said heating means, a temperature responsive device having an element movable responsively to variations of temperature of said water, a pair of members supported in spaced movable relation to said element and defining therebetween a position of said element representative of a degree of temperature to be maintained in said water, means associated with said members for actuating said controller whereby contact between said element and one of said members causes said controller to increase the action of said heating means and whereby contact between said element and the other of said members causes said controller to decrease the action of said heating means, a temperature responsive device having an element movable responsively to variations of temperature of said milk, and connecting means between said last mentioned element and said pair of members whereby said members are moved by the movement of said last mentioned element to effect a raising of the maintained degree of temperature of said water upon the lowering of the temperature of said milk and to effect a lowering of the maintained degree of temperature of said water upon the raising of the temperature of said milk, said connecting means being adjustable to selectively vary the extent of movement of said pair of members relative to the extent of movement of said last mentioned element.

14. Apparatus of the class described comprising, a conduit for liquid, a conduit for medium in heat exchange relation thereto, means for maintaining a normal temperature in the medium supplied to said medium conduit, and means associated with said medium temperature maintaining means and automatically operable therewith to effect the raising and lowering of said medium normal temperature responsively respectively to decreases and increases of temperature occurring in said liquid at a portion of said liquid conduit substantially distant from the outlet end thereof.

15. Apparatus of the class described comprising, a conduit for liquid, a conduit for medium in heat exchange relation thereto, automatic means for regulating the temperature of said medium uniformly at a normal degree and having a thermosensitive element in said medium, and temperature responsive means associated with said regulating means and having a thermosensitive element in said liquid at a point within said liquid conduit intermediate of the ends thereof, said temperature responsive means automatically causing said regulating means to raise and lower the normal degree of medium temperature responsively respectively to the decrease and increase of temperature of said liquid at said intermediate point within said liquid conduit.

16. Apparatus of the class described comprising, a conduit for liquid, a conduit for heat exchange medium arranged in heat exchange relation to said liquid conduit, means for heating the medium supplied to said medium conduit, controlling means for said medium heating means, thermally actuated means operable responsively to variations of temperature of the medium entering said medium conduit, thermally actuated means operable responsively to variations of temperature of the liquid in a portion of said liquid conduit substantially removed from the outlet end thereof, and means operatively related to said controlling means and to both said thermally actuated means whereby a rise or fall of temperature of said medium and/or said liquid at the endwardly removed portion of said conduit causes said controlling means to decrease or increase respectively the heating effect upon said medium of said medium heating means.

17. Apparatus of the class described comprising, a heat exchanger adapted to heat milk by the medium of flowing hot water, means for heating said water having an automatic controller, a temperature regulating device having an element movable in response to variations of temperature of said water before entry into said heat exchanger, a pair of members supported in spaced movable relation to said element and defining therebetween a selective approximate temperature to be maintained in said water upon entering said heat exchanger, means for actuating said controller adapted to cause increased heating of said water when said element is moved by the lowering of said water temperature into contact with one of said members and to decrease the heating of said water when said element is moved by the raising of said water temperature into contact with the other of said members, a temperature regulating device having an element movable in response to variations of temperature of said milk within said heat exchanger at an intermediate portion of its passage therethrough, and connecting means between said last mentioned element and said pair of members whereby said members are moved by the movement of said last mentioned element to effect the raising of the approximate water temperature defined by said members upon the lowering of the temperature of said milk and to effect the lowering of said approximate water temperature upon the raising of the temperature of said milk.

18. In combination with a milk heater having a heating medium passage and a milk passage in heat exchange relation and having means for heating a medium, apparatus for regulating the temperature of said medium comprising, a thermosensitive element in said medium passage, a thermosensitive element in said milk passage, and means actuated by said thermosensitive elements whereby the heating action of said medium heating means is controlled by variations of temperature in said medium passage and/or in said milk passage.

19. In combination with a milk heater having heat exchange passages for a heating medium and for milk respectively and having controllable means for heating a medium, apparatus for regulating the temperature of said medium comprising a thermosensitive element in said medium passage, a thermosensitive element in an intermediate portion of said milk passage, and means actuated by said thermosensitive elements whereby the heating action of said medium heating means is controlled by variations of temperature occurring in said medium passage and/or in the intermediate portion of said milk passage.

20. Apparatus for regulating the temperature of a heating medium in a milk heater having a milk passage and having medium heating means, comprising, a thermosensitive element adapted for contact with said medium, a thermosensitive element adapted for contact with the milk at an intermediate portion of said milk passage, and means adapted to automatically control said medium heating means, said controlling means being actuated by said thermosensitive elements individually and collectively.

In witness whereof I have hereunto attached my signature.

JOSEPH H. GODFREY.